US008612086B2

(12) United States Patent
Jardine

(10) Patent No.: US 8,612,086 B2
(45) Date of Patent: Dec. 17, 2013

(54) DIAGNOSTIC DEVICE WIRELESS INTERFACE VIA DIAGNOSTIC CABLE ADAPTER

(75) Inventor: Lee Jardine, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 874 days.

(21) Appl. No.: 12/551,904

(22) Filed: Sep. 1, 2009

(65) Prior Publication Data

US 2011/0054732 A1 Mar. 3, 2011

(51) Int. Cl.
*G01M 17/00* (2006.01)

(52) U.S. Cl.
USPC .......................................................... 701/29.1

(58) Field of Classification Search
None
See application file for complete search history.

(56) References Cited

U.S. PATENT DOCUMENTS

| | | | | |
|---|---|---|---|---|
| 5,357,519 | A * | 10/1994 | Martin et al. | 714/25 |
| 2004/0054503 | A1* | 3/2004 | Namaky | 702/183 |
| 2006/0149437 | A1* | 7/2006 | Somos | 701/29 |
| 2007/0233341 | A1* | 10/2007 | Logsdon | 701/29 |
| 2007/0244611 | A1* | 10/2007 | Brozovich | 701/29 |
| 2008/0228344 | A1* | 9/2008 | Sampson et al. | 701/33 |
| 2009/0216401 | A1* | 8/2009 | Underdal et al. | 701/35 |
| 2009/0219822 | A1* | 9/2009 | Variyath et al. | 370/245 |
| 2009/0300548 | A1* | 12/2009 | Sullivan et al. | 715/830 |
| 2010/0076644 | A1* | 3/2010 | Cahill et al. | 701/33 |

* cited by examiner

*Primary Examiner* — Thomas Tarcza
*Assistant Examiner* — Adam Alharbi
(74) *Attorney, Agent, or Firm* — Baker & Hostetler LLP

(57) ABSTRACT

A wireless interface is provided and coupled to a diagnostic device in order to provide it with wireless communication. The wireless interface includes a diagnostic device interface, a diagnostic cable interface and a wireless adapter. The wireless interface can relay diagnostic information from a vehicle to the diagnostic device when the wireless interface is coupled to a diagnostic cable, which is connected to a vehicle.

21 Claims, 2 Drawing Sheets

DIAGNOSTIC DEVICE WIRELESS INTERFACE VIA DIAGNOSTIC CABLE ADAPTER

FIELD OF THE INVENTION

The present invention relates generally to vehicle diagnostic devices. More particularly, the present invention relates to a wireless interface for a vehicle diagnostic device.

BACKGROUND OF THE INVENTION

Vehicle diagnostic device are used to diagnose trouble codes set in a vehicle. The diagnostic device typically has various connections on it including a serial interface, memory card slot, vehicle cable interface, USB (universal serial bus), scope connections and others.

Wireless adapters can be connected to a diagnostic device via the USB connection or via a PC card. However, often times the USB connection and/or the PC card slots are used for other functionality or are not equipped on the diagnostic device. Accordingly, it is desirable to provide a wireless interface that can connect to a diagnostic device when other connection ports are unavailable.

SUMMARY OF THE INVENTION

The foregoing needs are met, to a great extent, by the present invention, wherein in one aspect an apparatus is provided that in some embodiments include a wireless interface that can mate with a diagnostic device and a diagnostic cable. The wireless adapter will allow any computing device such as the diagnostic device to communicate wireless through it.

In accordance with one embodiment of the present invention, a wireless interface for a diagnostic device is provided, which can comprise a diagnostic device interface having a first connector that is configured to mate with a second connector on a diagnostic device, a diagnostic cable interface having a third connector that is configured to mate with a fourth connector on a diagnostic cable, and a wireless adapter configured to provide wireless communication for the diagnostic device.

In accordance with another embodiment of the present invention, a wireless interface for a diagnostic device is provided, which can comprise a first means for interfacing configured to mate with a diagnostic device, the first means having a first connector that is configured to mate with a second connector on the diagnostic device, a second means for interfacing configured to mate with a diagnostic cable, the second means having a third connector that is configured to mate with a fourth connector on the diagnostic cable, and a means for communicating wirelessly configured to provide wireless communication for the diagnostic device.

In accordance with yet another embodiment of the present invention, is a method of providing wireless communication for a diagnostic device, which can couple a wireless interface having a diagnostic device interface with a diagnostic cable connector of the diagnostic device, communicate information between the wireless interface and the diagnostic device, and send the information from the diagnostic device wirelessly via the wireless interface to a remote device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
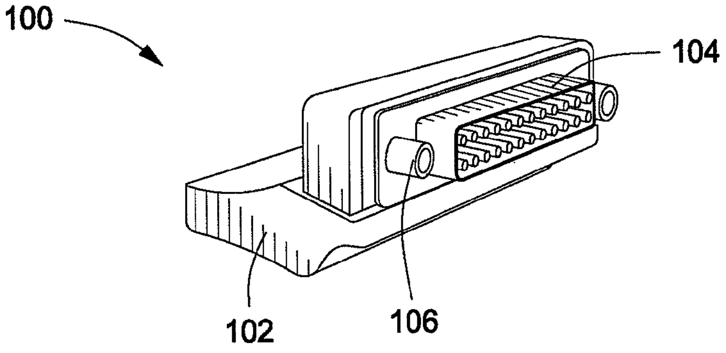
FIG. 1 is a perspective view illustrating a wireless interface according to an embodiment of the invention.

The invention will now be described with reference to the drawing figures, in which like reference numerals refer to like parts throughout. An embodiment in accordance with the present invention provides a wireless interface that includes a mating connection for the diagnostic cable on one side and a mating connection on a second side for a diagnostic device. In other embodiments, the mating connection can be any type of connection such as a USB, Firewire, RS232 and others.

An embodiment of the wireless interface 100 is illustrated in FIG. 1. The wireless interface 100 includes a wireless adapter 102, a diagnostic device interface 104 with pin receiving portion 106 and a diagnostic cable interface 110 (FIG. 2) with pin receiving portion 106. The wireless adapter 102 is configured to communicate with a computing device, such as the diagnostic device, through the diagnostic device interface 104 so that the diagnostic device can communicate wirelessly with a remote device, as discussed below. The remote device can be another computing device, server, a tire pressure monitor remote module, wireless vehicle information interface, or other devices.

Figure 2:
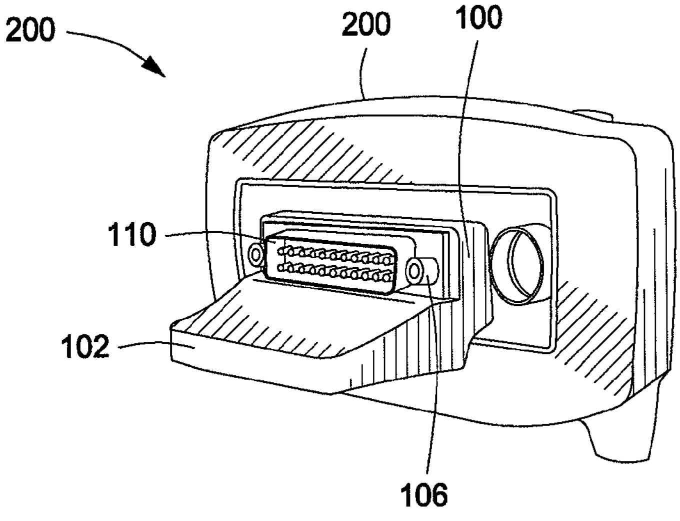
FIG. 2 illustrates the wireless interface being coupled to the diagnostic device.

The diagnostic device interface 104 can be the female portion of a DB25 and is configured to receive the male portion of the DB25 of the diagnostic device 200 (as shown in FIG. 2 as 110). In another embodiment, the male portion of the DB25 can be from an end of a diagnostic cable. The diagnostic device interface's 104 female portion of the DB25 can be connected to a diagnostic device 200 (FIG. 2). The diagnostic device interface 104 can include pin receiving portion 106 to receive pins that help to secure, for example, the diagnostic cable to the diagnostic device interface 104. In other embodiments, the interfaces can have other types of connectors such as RS-232, 242, and others. Further, the male portions and females portions stated herein are interchangeable as needed.

FIG. 2 illustrates the wireless interface 100 being coupled to the diagnostic device 200. In this view, the female portion of the DB25 of the diagnostic device interface 104 is directly coupled to the male portion of the DB25 of the diagnostic device 200. In other embodiments, this is where the female portion of the DB25 of the diagnostic cable would connect to the diagnostic device 200. The male portion 110 of the DB25 of the diagnostic cable is available to couple to the female portion of the DB25 of the diagnostic cable (not shown). In one embodiment, the wireless adapter 102 is located below the diagnostic device interface 104 and the diagnostic cable interface 110. In other embodiments, the wireless adapter 102 can be on the same level or above or offset from the diagnostic device interface 104 and the diagnostic cable interface 110.

The pin receiving portion 106 can receive pin located on the female portion of the diagnostic cable in order to secure the diagnostic cable to the male portion of the DB 25 of the diagnostic cable interface 110. With the pins in place, when the diagnostic device 200 is moved around the vehicle, the diagnostic device 200 and the diagnostic cable do not inadvertently disconnect from each other.

Figure 3:
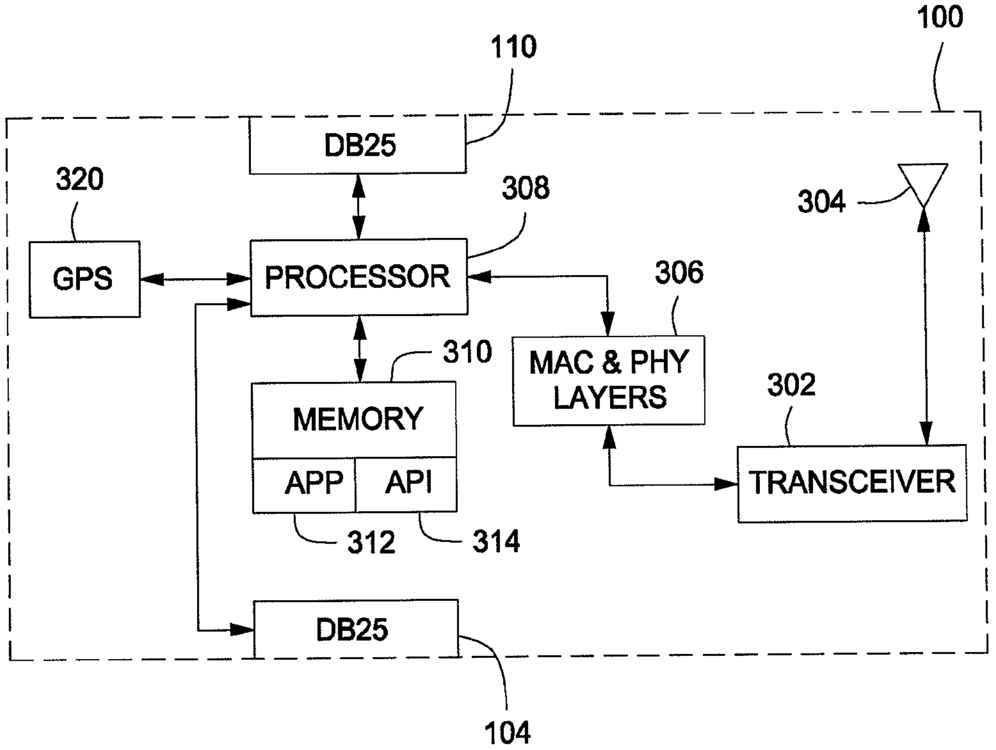
FIG. 3 illustrates a block diagram of exemplary components of the wireless interface.

FIG. 3 illustrates a block diagram of exemplary components of the wireless interface 100. The components of the wireless interface 100 can include a wireless transceiver 302, an antenna 304, MAC and PHY layers 306, a processor 308, a memory 310 having an application 312 and an API (application programming interface) 314, the diagnostic device interface 104, the diagnostic cable interface 110 and an optional GPS transceiver 320.

Power to these and other components of the wireless interface 100 may be obtained from the computing device, such as the diagnostic device 200, attached to the wireless interface 100. In another embodiment, the wireless interface 100 may have its own power such as an internal battery (not shown). In still another embodiment, the wireless interface may be powered by a vehicle's battery that may be directly or indirectly coupled via a cable, such as the diagnostic cable, to the wireless interface 100.

The wireless transceiver 302 may transmit and receive various types of signals such as 802.11x (WiFi), WLAN (Wide Local Area Network), WAN (Wide Area Network), CDPD (Cellular Digital Packet Data), HSCSD (High Speed Circuit Switched Data), PDC-P (Packet Data Cellular), GPRS (General Packet Radio Service), 1xRTT (1x Radio Transmission Technology), Bluetooth, IrDA (a standard for an interoperable universal two way cordless infrared light transmission data port), MMDS (Multichannel Multipoint Distribution Service), LMDS (Local Multipoint Distribution Service), WiMAX (Worldwide Interoperability for Microwave Access), satellite, radio frequency and others. The types of wireless communication capable of being supported by this invention can include, Infrared Wireless Transmission, Broadcast Radio, Microwave Radio, and Communication Satellite and other types of wireless communication.

The wireless transceiver 302 sends and receives wireless signals via the antenna 304. Optionally, the GPS transceiver may also use the antenna or may have its own antenna (not shown). The antenna 304 can be external or internal depending on the needs of the user or designer. The transceiver signals may be processed by the processor 308 with the help of the MAC (Medium Access Control) and PHY (Physical Layers) 306. The MAC controls how a computing device, such as the diagnostic device, on a network gains access to data and authenticate the signal. The physical layers define the means of transmitting raw bits rather than logical data packets over a physical link connecting network nodes.

The processor 308 processes the signals based on instructions stored in the memory 310. The memory can be any type of memory including flash, SIMM (Single In-Line Memory Module), DIMM (Dual In-Line Memory Module), SODIMM (Small Outline Dual In-Line Memory Module), DRAM (Dynamic Random Access Memory), RAM (Random Access Memory) and others. The memory 310 includes the APP (Application) 312 and the API (Application Protocol Interface) 314. The API is an interface that sets out the ways by which the APP may request services from libraries and/or operating systems. In one embodiment, the processor 308 communicates with and controls the diagnostic device interface 104 and diagnostic cable interface 110. In this embodiment, the processor can control information being sent and received by the diagnostic device 200.

In one embodiment, the processor 308 may allow the signals between the diagnostic device interface 104 and diagnostic cable interface 110 to pass through to each other without processing the signals. This would allow signals to be transmitted between the interfaces 104, 110 when there is no power to the wireless adapter. In other words, the processor can be a pass-through component.

In another embodiment, the processor 308 can control information being sent and received by another computing device connected directly or indirectly via the diagnostic cable interface 110. The other computing device can be connected directly to the diagnostic cable interface 110 or be remote by being connected, for example, via the diagnostic cable to the wireless interface 100. In this embodiment, another computing device can be attached to the wireless interface in order to receive and transmit wireless signals. In one embodiment, the computing device may be a computer in a vehicle, such as an ECU (Electronic Control Unit) that can use the wireless interface to send information, such as OBD II information.

The wireless interface can include components to transmit and receive for one computing device, such as the diagnostic device 200 or another computing device. Alternatively, the wireless interface may include the components necessary (as described in FIG. 3 or include other or duplicative components) in order to simultaneously transmit and receive signals for two or more computing devices.

In an alternative embodiment, the wireless adapter includes a GPS (global positioning system) transceiver 320 to provide location information of the wireless interface 100 and the diagnostic device 200 that is directly or indirectly coupled to the wireless interface 100. The GPS transceiver may also include or be coupled to an altimeter to determine the altitude of the wireless interface 100. The memory 310 can be used to store cartographic data, such as electronic maps. The memory can store all the maps for the U.S. (or country of use), North America or can have the region or state where the wireless interface 100 is located. In alternative embodiments, the wireless interface 100 can have all the maps of the world or any portion of the world desired by the user. The GPS transceiver 320 communicates with and "lock on" to a certain number of satellites in order to have a "fix" on its global location. Once the location is fixed, the GPS transceiver 320, with the help of the processor 308, can determine the exact location including longitude, latitude, altitude, velocity of movement and other navigational data. Should the GPS transceiver 320 be unable to lock on to the required number of satellites to determine the altitude or unable to determine the altitude for any reason, the altimeter can be used to determine the altitude of the wireless interface 100.

Figure 4:
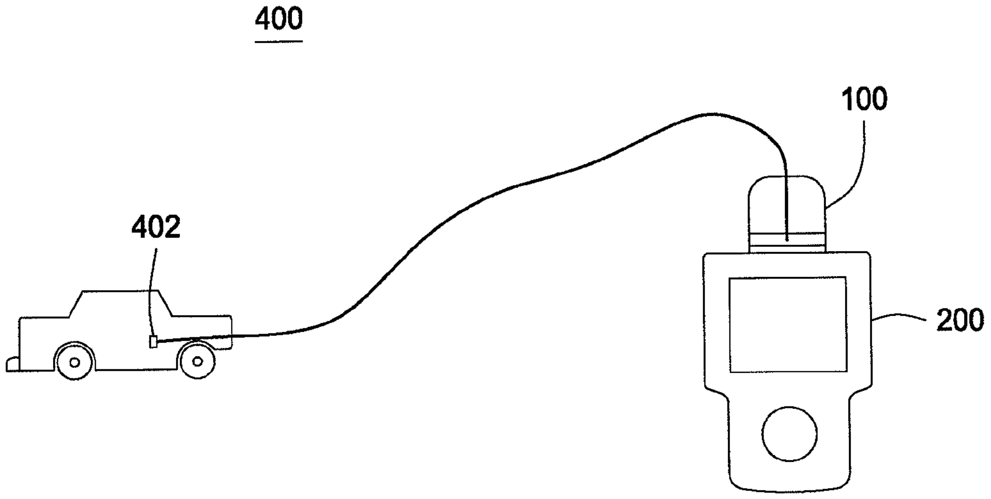
FIG. 4 illustrates an example of the connections of a system having the wireless interface.

FIG. 4 illustrates an example of the connections of a system 400 having the wireless interface 100. The wireless interface's diagnostic device interface 104 is attached to the diagnostic device's DB25 connector, as previously show in FIG. 2. The diagnostic cable is connected at one end to the wireless interface's diagnostic cable interface 110 and at the other end to the vehicle's data link connector or OBD II connector 402. With the wireless interface 100 coupled to the diagnostic device 200, the diagnostic device 200 can now transmit or receive wireless communication. Further, the wireless interface 100 allows the diagnostic device 200 to continue to perform its diagnostic functions on the vehicle while receiving and transmitting wireless communication. The diagnostic function and receiving and transmitting functions can be performed simultaneously.

In another embodiment of the invention, the wireless interface can be updated via the diagnostic cable interface 110 or the diagnostic device interface 104. The interfaces 104, 110 allow communication between the wireless interface 100 and the various computing devices and thus the various computing devices can provide updated software and firmware to the wireless interface 100. In still another embodiment, the wireless interface can be used by the diagnostic device to update, for example, an ECU in the vehicle or the remote device.

In operation, with the wireless interface connected to the computing device, such as the diagnostic device, can communicate wirelessly. This will allow older generation of devices that do not have built-in wirelessly capability to communicate wirelessly with remote devices. This functionality will allow repair shops to keep their existing devices and save the costs of buying a new diagnostic device just to add the wireless capability.

The wireless interface can be connected using existing connections on the computing devices without having to retrofit the computing device with a new board or electronics. Further, the wireless interface does not have to interfere with existing connections as it can merely be added serially, for example, along an existing connection. The wireless interface can allow the existing connections to continue to communicate without interfering with the signals of communication.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A wireless interface for a diagnostic device, comprising:
- a diagnostic device interface having a first connector that is configured to mate with a second connector on a diagnostic device;
- a diagnostic cable interface having a third connector that is configured to mate with a fourth connector on a diagnostic cable; and
- a wireless adapter configured to provide wireless communication for the diagnostic device,
- wherein the diagnostic device interface, the diagnostic cable interface, and the wireless adapter are arranged in a component configured to mate with the diagnostic device and configured to mate with the diagnostic cable;
- wherein the wireless interface includes a processor that passes through diagnostic information between the diagnostic device interface and the diagnostic cable interface without processing the diagnostic information.

2. The interface of claim 1, wherein the wireless adapter further comprises:
- a processor that processes the wireless communication;
- a memory in communication with the processor;
- a transceiver to send and receive wireless communication and in communication with the processor; and
- an antenna in communication with the transceiver.

3. The interface of claim 1, wherein the wireless interface includes a processor that controls diagnostic information between the diagnostic device interface and the diagnostic cable interface.

4. The interface of claim 1, wherein the first, second, third and fourth connectors are DB 25 connectors.

5. The interface of claim 2 further comprising a GPS transceiver that provides location information of the wireless interface.

6. The interface of claim 2, wherein the memory stores an application and an application programming interface.

7. The interface of claim 2, wherein the processor communicates with MAC and physical layers to process the wireless communication.

8. The interface of claim 1, wherein the first and fourth connectors are female DB25 connectors and the second and third connectors are male DB25 connectors.

9. The interface of claim 1, wherein the wireless interface is powered by the diagnostic device when coupled to the diagnostic device.

10. A wireless interface for a diagnostic device, comprising:
- a first means for interfacing configured to mate with a diagnostic device, the first means having a first connector that is configured to mate with a second connector on the diagnostic device;
- a second means for interfacing configured to mate with a diagnostic cable, the second means having a third connector that is configured to mate with a fourth connector on the diagnostic cable; and
- a means for communicating wirelessly configured to provide wireless communication for the diagnostic device,
- wherein the first means for interfacing, the second means for interfacing, and the means for communicating wirelessly are arranged in a component configured to mate with the diagnostic device and configured to mate with the diagnostic cable;
- wherein the wireless interface includes a processor that passes through diagnostic information between the diagnostic device interface and the diagnostic cable interface without processing the diagnostic information.

11. The interface of claim 10, wherein the wireless adapter further comprises:
- a processor that processes the wireless communication;
- a memory in communication with the processor;
- a transceiver to send and receive the wireless communication and in communication with the processor; and
- an antenna in communication with the transceiver.

12. The interface of claim 10, wherein the wireless interface includes a processor that controls diagnostic information between the first means for interfacing and the second means for interfacing.

13. The interface of claim 10, wherein the first, second, third and fourth connectors are DB 25 connectors.

14. The interface of claim 11 further comprising a GPS transceiver that provides location information of the wireless interface.

15. The interface of claim 11, wherein the memory stores an application and an application programming interface.

16. The interface of claim 11, wherein the processor communicates with MAC and physical layers to process the wireless communication.

17. The interface of claim 10, wherein the first and fourth connectors are female DB25 connectors and the second and third connectors are male DB25 connectors.

18. The interface of claim 10, wherein the wireless interface is powered by the diagnostic device.

19. A method of providing wireless communication for a diagnostic device, comprising the steps of:

coupling a wireless interface having a diagnostic device interface with a diagnostic cable connector of the diagnostic device;

communicating information between the wireless interface and the diagnostic device; and sending the information from the diagnostic device wirelessly via the wireless interface to a remote device, wherein the diagnostic device interface and the wireless interface are arranged in a component configured to mate with the diagnostic device;

wherein the wireless interface includes a processor that passes through diagnostic information between the diagnostic device interface and the diagnostic cable interface without processing the diagnostic information.

20. The method of claim 19 further comprising the step of:

receiving the information wirelessly via the wireless interface from the remote device.

21. The method of claim 19 further comprising the steps of:

coupling a first end of a diagnostic cable to a diagnostic cable interface of the wireless interface;

coupling the second end of the diagnostic cable to a data link connector on a vehicle; and relaying vehicle diagnostic information to the diagnostic device through the wireless interface.

* * * * *